May 6, 1930.                L. B. SPERRY                1,757,096
                    GYROSCOPIC PILOT FOR AEROPLANES
                 Original Filed Aug. 1, 1916    2 Sheets-Sheet 1

INVENTOR
LAWRENCE B. SPERRY.
BY
Herbert H. Thompson
ATTORNEY

May 6, 1930.  L. B. SPERRY  1,757,096
GYROSCOPIC PILOT FOR AEROPLANES
Original Filed Aug. 1, 1916  2 Sheets-Sheet 2

INVENTOR
LAWRENCE B. SPERRY.
BY
Herbert H. Thompson
ATTORNEY.

Patented May 6, 1930

1,757,096

UNITED STATES PATENT OFFICE

LAWRENCE B. SPERRY, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

GYROSCOPIC PILOT FOR AEROPLANES

Application filed August 1, 1916, Serial No. 112,505. Renewed January 2, 1930.

This invention relates to steering devices for dirigible vehicles, such as aeroplanes, torpedoes and the like. The main object of the invention is to devise a simple automatic steering gear which will relieve the aviator of the major portion of the work involved in steering the aeroplane, and at the same time enable it to be brought under the instant control of the aviator.

A further object of the invention is to provide means whereby an aircraft may be flown upon a predetermined course and also with means whereby the said course may be changed at will.

The principal elements of my device comprise a small gyroscope of simple design, adapted to maintain a constant position in azimuth for a fairly long period of time, and a servo-motor controlled from said gyroscope and connected with the rudder. In navigating aircraft it is not necessary to provide an extremely accurate azimuth indicator such as the Sperry gyroscopic compass, as the shifting currents of air will carry the aviator off his course sooner or later, even if the aeroplane is under the control of the most precise gyroscopic compass. I therefore propose to make use of a comparatively small compass, which will maintain its position in azimuth with a fair degree of accuracy, and to make use of correcting or setting devices controlled by the aviator for periodically placing the machine upon the required course and resetting the gyroscope, or for altering the course at will.

Referring to the drawings in which what I now consider to be the preferred form of my invention is shown, Fig. 1 is a side elevation, partly in section, of a gyroscopic unit, designed according to my invention for use in steering an aeroplane or other dirigible vessel.

Figure 1:
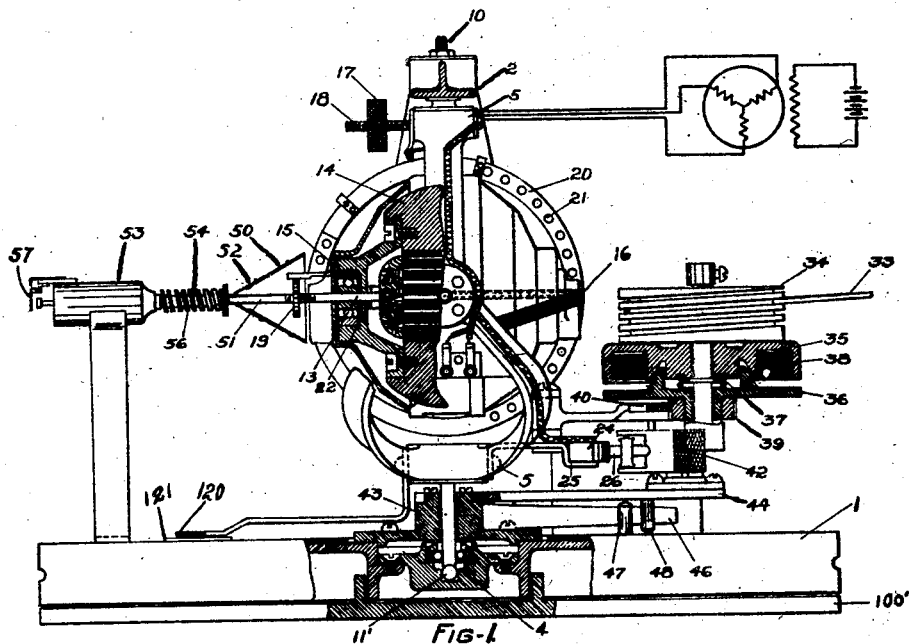

Taking up first my preferred form of gyroscopic unit:—1 denotes a suitable base on which is mounted a vertical bracket 2. Within vertical bearings 3 and 4 in the ring and base respectively is rotatably mounted a vertical or gimbal ring 5, within which the rotor bearing casing or gimbal 6 is pivotally supported on horizontal pivots 7 and 8. All of the pivots mentioned are equipped with antifriction bearings 9, and each set is provided with a special take-up device adapted to compensate for wear in the ball bearings and to thereby prevent any end-wise play in the pivots. This device may comprise a set screw 10 or other adjustable device adapted to clamp upon a ball 11 situated between said screw and the end of the pivot 12 on the ring or casing. The other end of the bearing is also supported on a ball 11'. An index 120 may be attached to ring 5, if desired for indicating changes in the heading of the aircraft by cooperating with a suitable scale 121 on base 1.

Figures 3, 4:
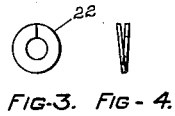
Figures 3 and 4 are a plan and side view respectively of a spring washer used in the gyroscope.
Figure 5:
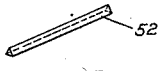
Fig. 5 is a detail, and Fig. 6 a front elevation of a device which I term a centralizing member.
Figure 6:
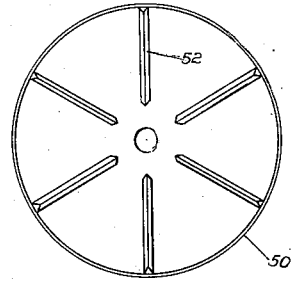

The gyroscope proper is mounted within the casing 6 and is preferably constructed as an integral part of a polyphase induction motor. The stator of said motor is placed upon a fixed shaft 13 supported within the casing, and upon said stator are placed all of the polyphase windings. The rotor may be of standard squirrel cage construction as far as electrical features are concerned. Mechanically it is made, however, in the form of a heavy fly-wheel 14 journalled upon said shaft 13 on anti-friction bearings 15. It will be seen in this construction that the rotor completely encloses the stator and thus gives a maximum moment of inertia to the rotating parts. The wires 16 are brought into the stator through one end of shaft 13, which is made hollow for the purpose. I find it important that all end play of the rotor upon shaft 13 be prevented. For this purpose I mount between the rotor and a fixed portion of the shaft or stator a small washer 22 which is split and sprung apart somewhat as indicated in Fig. 4, so that the resilience of the washer will take up any end play that may exist, or that may be caused by the wearing down of the ball bearings.

An adjustable weight 17 is shown threaded upon a shaft 18 secured to the ring 5 for the purpose of adjusting the balance of the gyroscope about the vertical axis. The balance about the horizontal pivots 7 and 8 is adjusted by means of a threaded weight 19 mounted upon shaft 13 or an extension thereof. Weight 19 may also be used to adjust the balance of the gyroscope for different latitudes in order to cause precession of the gyroscope at the required rate to keep up with the earth. A ring 20 provided with a series of holes 21 may also be used for adjusting the balance by placing small weights in the various holes. These refinements are very essential to the proper operation of the gyroscope, it being important that the gyroscope be balanced about each of its three axes. The aeroplane is controlled from a gyroscope indirectly by means of electric contacts which operate a servo-motor connected to the rudder. The contacts are shown as consisting of a pair of conducting segments 23 and 24 mounted on an arm 25 secured to the vertical ring 5. A trolley or brush 26 bears upon said segments and is adapted to complete a circuit through one or the other of the windings 27 or 28 on the servo-motor 29. The servo-motor is shown diagrammatically only and comprises a pair of gears 100 and 101 continuously driven in opposite directions by a pair of intermeshing pinions 102, 103. One of the pinions 102 is shown as mounted on the same shaft 104 as a fan or windmill 105, which is driven by the air currents caused by the flight of the aeroplane. The windings 27 and 28 are adapted to force the adjacent gear into contact with a clutch disc 106 secured to shaft 129, so that it may be driven in either direction. Follow up wires 33 from drum 34 are wrapped upon a drum 108 driven from shaft 129 through suitable gearing 109, while the rudder wires 31 and 32 engage a similar drum 110.

The servo-motor is not only connected to the rudder 30 by means of wires 31 and 32, but is also connected with the gyroscopic unit so that a follow-up connection is provided between the two. The principal object of the follow-up connection is to reduce or prevent hunting of the aeroplane, in azimuth, about its predetermined course. This connection may consist of a wire 33 extending from the servo-motor around a drum 34 mounted adjacent to the gyroscope. Secured to said drum is one emember 35 of an electro-magnetic clutch, the other member 36 of which is normally held disengaged therefrom by spring 37, but is clutched thereto on excitation of winding 38. Member 36 is provided with a pinion 39 meshing with a gear segment 40. The said segment is connected to the block 42 carrying trolley 26 by means of a link 41 so that when the clutch is engaged a follow-up motion will be imparted to the trolley from the servo-motor or other part of the steering apparatus.

The trolley block 42 is mounted upon an arm 44 pivotally supported on a boss 43 extending from base 1. Also mounted on or near said base are a pair of spaced leaf springs 46 which engage over an upwardly extending pin 47 on said base and downwardly extending pin 48 on the arm 44. The pins are so located that the trolley is normally positioned between the two contact strips 23, 24. It will be seen that as long as the clutch is engaged the trolley 26 will follow the movements of the servo-motor, but as soon as it is disengaged the trolley will be returned to its centralized position with respect to said reversing contacts by springs 46.

On the opposite side of the gyroscope from the drum is shown a special device which I employ to bring the gyroscope quickly back to a predetermined relation or centralized position with respect to the aeroplane at the will of the aviator. This device consists of tapering or conical shaped member 50 adapted to be moved toward the gyroscope and to engage a stem 51 extending from the casing or inner gimbal 6 of the gyroscope. Member 50 is preferably provided with inwardly extending radial blades or fins 52 which perform the important function of stopping the precessional movements of the gyroscope. Without some such means any attempt to move the gyroscope directly to a new position would only result in precession of the gyroscope at right angles to the application of the force, but by applying a force in the required direction and at the same time stopping the precession, the gyroscope may be brought quickly to any desired position.

Figure 7:
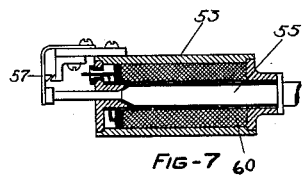
Fig. 7 is a longitudinal section of the solenoid adapted to control said centralizing member.

Member 50 is controlled by means of a solenoid 53, the said member being secured to an extension 54 of the core 55 of the solenoid. A spring 56 is provided to hold the member 50 normally in the engaged position. On excitation of the solenoid, member 50 is quickly withdrawn out of the path of the stem 51. I prefer to provide means for reducing the current flowing through the solenoid after the core has been drawn fully within it, since a greater current is required to bring the core to this position than to hold it there. For this purpose we have provided a switch 57, which is opened when the core is in the innermost position as shown in Fig. 7. This switch is connected so as to cut out or short circuit a resistance 58, which is otherwise connected with the winding 60 of the solenoid (see Fig. 8).

Figure 8:
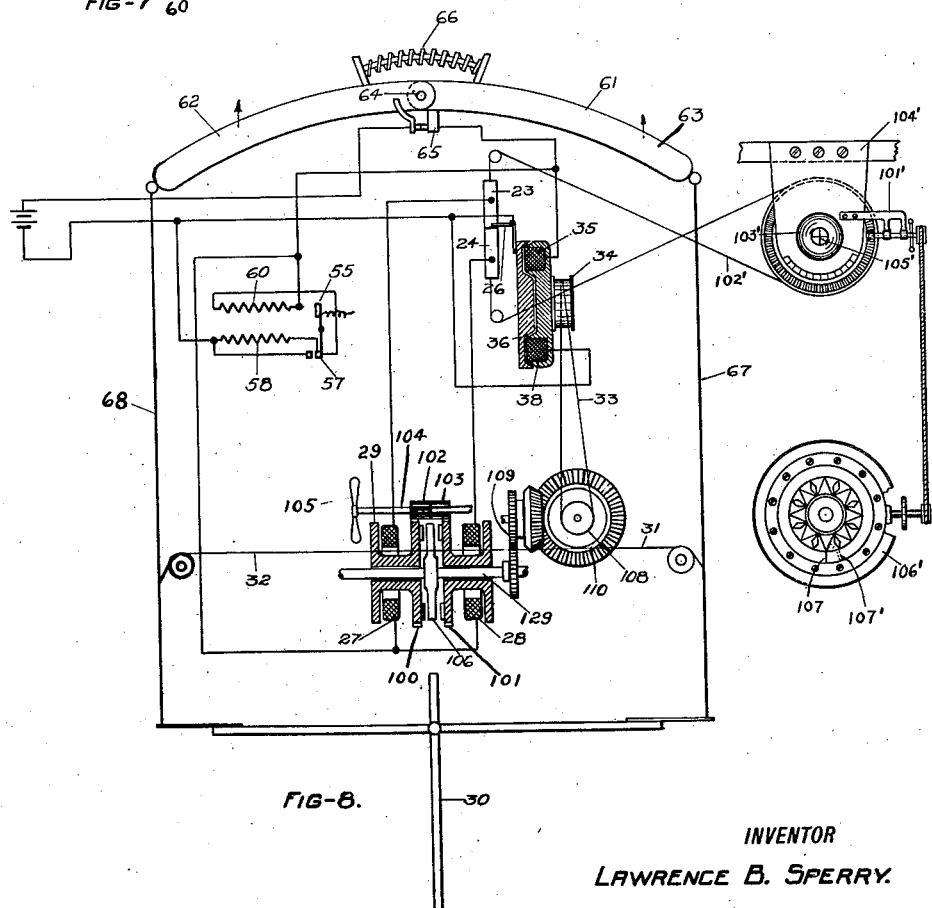
Fig. 8 is a diagrammatic view and wiring diagram illustrating the application of my invention to an aeroplane.

The means directly controlled by the aviator for actually controlling the rudder is represented in Fig. 8 at 61. As far as this invention is concerned, said means may comprise any suitable form of handle, foot pedal, or other controlling means, but which has incorporated therein a novel form of switch. The controlling means is shown as a foot pedal made in two parts, 62 and 63, hinged together at 64. One half of a two part contact button 65 is placed upon each lever so that when the levers are rotated in opposite directions a slight distance from the position shown in figure 8 the circuit will be opened. A strong compression spring 66 is provided to hold the contacts normally closed. It will be seen however, that as soon as the aviator pushes upon either or both levers to rotate the rudder, the compression spring will yield and the button open. This will not, however interfere with the steering of the craft as there is always sufficient give to the wires 67 and 68 extending from the pedal to the rudder 30 to allow for this slight lost motion.

Button 65 is in circuit not only with magnetic clutch winding 38, but also with the servo-motor and the solenoid 60, so that the effect of opening the button will be:

1st, to sever the follow-up connection between the servo-motor and the gyroscope.

2nd, to cut out the servo-motor and render it inoperative.

3rd, to automatically centralize the gyroscope.

I find in practice, however, that it is not necessary to disconnect the follow-up connections between the servo-motor and the gyroscope so that clutch 38 and associated parts may be omitted if desired.

By a further movement of the foot pedals the aviator can then shift the rudder 30 directly to a new position. Upon release of the rudder in this position the servo-motor will again be energized, the following-up connection completed, and the gyroscope released, so that the automatic pilot will take up the steering of the aircraft where the aviator left it, and maintain it on its course until the aviator again desires to change the course or to correct for side drift.

Figure 2:
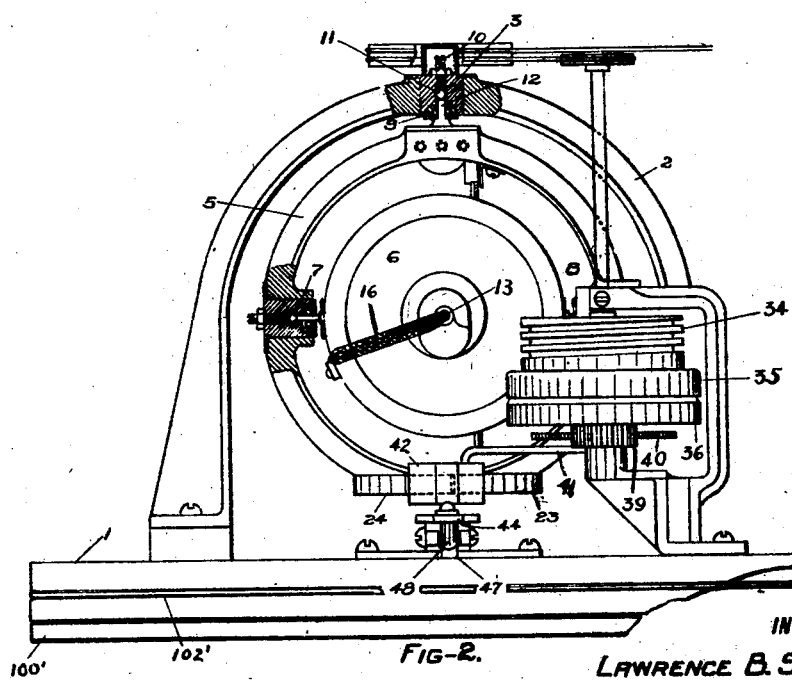
Fig. 2 is a front elevation of the same, a few parts being in section.

Another system for correcting for side drift which may be effectively employed is to couple the gyroscopic unit or some part connected therewith to a drift indicator such as disclosed in my copending application— Steering device for aircraft, filed March 24th, 1915, now matured into Patent No. 1,390,653, dated September 13, 1921. For this purpose the entire gyro-unit may be pivotally mounted on a base 100' so that it may be readily rotated from a sighting device 101' by means of wires 102' or the like. As shown in Fig. 2, wires 102' are wound about base 1 to turn the latter on base 100'. The turning of base 1, of course, shifts brush or trolley 26, while contacts 23 and 24 are maintained relatively stationary by the gyroscope. As the effect of such a rotation of base 1 is to shift the relative position of contacts 23, 24 and to brush 26, the wires 102' are shown as connected to the contacts in Fig. 8. The sighting device consists in a small telescope 103' rotatably mounted about a vertical axis in a bracket 104'. The telescope is provided with a line or cross hairs 105' adapted to be turned in the direction of the true line of flight, as observed by the direction of the stream lines seen through the telescope. The telescope is connected to a compass 106', so that when it is turned, the lubbers line 107 of the compass will be correspondingly shifted to a position 107', say. Without a connection such as wires 102', the observer would then move the pedals 61, 62 so as to turn the machine back through an angle approximately equal to the angle through which line 107 has been moved. Wires 102' are so connected, however, that the gyro-unit, is turned backwardly through the angle, so that, as the telescope is being turned the unit is turned in the opposite direction and the rudder 30 turned by means of the servo-motor through the correct angle to bring the machine to the correct course.

It should also be observed when the base 1 is rotated by wires 102' by the observer through his rotation of the sighting device that the reading of pointer 120 on its scale 121 is changed, since the latter is mounted on base 1 and the former is held stationary by the gyroscope. When the gyroscope of my invention is being used as a flight indicator, the observer at the sighting device may readily show the pilot at the gyroscope when to make the desired change of course. The pilot thereupon brings the aeroplane around until the pointer again reads at the proper reading on the scale. If no pilot is used, this function is accomplished automatically as described.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic pilot for aircraft, the combination with the vertical rubber, of a gyroscope for normally controlling the same to maintain the craft on a course, means for altering the course of the craft including means for temporarily locking the gyroscope, and means for turning the rudder to bring the craft to a new course.

2. In an automatic pilot for aircraft, the combination with a rudder and means for controlling the same at will, of a gyroscope, a servo-motor connected with the rudder and controlled from said gyroscope, and means brought into action by movement of said first named means for centralizing said gyroscope.

3. In an automatic steering device for aeroplanes, the combination with a vertical rudder and means for controlling the same at will, of a gyroscope, a servo-motor, connections between the servo motor, rudder and gyroscope and means responsive to movement of said first named means for severing the connections between said servo-motor and the gyroscope, whereby the course may be altered, and means for restoring said connections after said movement to maintain the new course.

4. In an automatic pilot for aircraft, in combination with a rudder, a gyroscope, servo-motor, connections between the servo-motor, rudder and gyroscope including a primary connection and a follow-up connection between said gyroscope and said motor, and means for changing the course of the aircraft comprising means for turning the rudder and means for severing said connections between the servo-motor and the gyroscope while the rudder is being turned.

5. In an automatic pilot for aeroplanes, the combination with a rudder and a manual control device therefor, of a gyroscope, a servo-motor, connections between the servo-motor, rudder and gyroscope and means responsive to movement of said manual device for severing the connections between said servo-motor and the gyroscope, and for centralizing said gyroscope.

6. In an automatic pilot for aeroplanes, the combination with a rudder and a means for actuating the same at will, of a gyroscope, a servo-motor, connections between the servo-motor, rudder and gyroscope and means responsive to movement of said first named means for severing the connections between said servo-motor and the gyroscope, for centralizing said gyroscope and for rendering said motor inoperative.

7. In gyroscopic apparatus for dirigible craft, the combination with a gyroscope having a plurality of degrees of freedom, of means for centralizing said gyroscope comprising a projecting member and a hollow tapering member for engaging the same, one of said members being mounted on the gyroscope the other on a fixed part, means for imparting relative movement to said members and means controlled by the relative position of said craft and gyroscope for governing the course of the craft.

8. In gyroscopic apparatus for dirigible aircraft, the combination with a gyroscope having a plurality of degrees of freedom, of means for centralizing said gyroscope comprising a projecting member and a hollow tapering member for engaging the same, having inwardly projecting ribs, one of said members being mounted on the gyroscope the other on a fixed part, means for imparting relative movement to said members and means controlled by the relative position of said craft and gyroscope for governing the course of the craft.

9. The combination with a gyroscope mounted for oscillation about a vertical axis, a member mounted for movement about the same axis, a plurality of electric contacts mounted on said gyroscope and on said member, said contacts comprising a contact segment and a co-operating brush, a clutch member adapted to engage and disengage said member, means for oscillating said clutch member, and resilient means for bringing the said contacts to their neutral position when said clutch is released.

10. In an automatic pilot for aeroplanes, the combination with a vertical rudder and control device therefor, operable at will, of a gyroscope, a servo-motor, means including a follow-up connection connecting said servo-motor, rudder and gyroscope and means responsive to movement of said device for breaking said follow-up connection.

11. In a steering device for aeroplanes the combination with a vertical rudder, of a servo-motor for controlling the same, a gyroscope, means for supporting the same for turning about a vertical axis and for oscillation about a horizontal axis, means operable by relative turning of the gyroscope and areoplane about said vertical axis for controlling said motor, a follow-up connection from the rudder to the second mentioned means, means for breaking said connection, and means for changing the relation between said rudder and said second mentioned means while said connection is broken.

12. In a steering device for aeroplanes the combination with a vertical rudder, of a servo-motor for controlling the same, a gyroscope, means for supporting the same for turning about a vertical axis, means operable by relative turning of the aeroplane and gyroscope about said axis for controlling said motor, a drift indicator, and means connecting said indicator and said other means for shifting the effective relation of said means, whereby the aeroplane is automatically brought on a true course.

13. In a steering device for aeroplanes the combination with a vertical rudder, of a servo-motor for controlling the same, a gyroscope, means for supporting the same for turning about a vertical axis, means operable by relative turning of the aeroplane and gyroscope about said axis for controlling said motor, a drift indicator, and means connecting said indicator and said gyroscope, whereby the effective relation of said other means is shifted and the aeroplane turned to correct for side drift.

14. In an automatic steering device for aircraft, the combination with a rudder and a servo-motor for controlling the same, of an azimuth indicator, means brought into action by relative turning of the aeroplane and indicator for actuating the servo-motor, a drift indicator, and means connecting said indicators whereby the said first means are shifted to change their effective relation.

15. In a steering device for aeroplanes the combination with a vertical rudder, of a servo-motor for controlling the same, a gyroscope, means for supporting the same for turning about a vertical axis, means operable by relative turning of the aeroplane and gyroscope about said axis for controlling said motor, a drift indicator, a compass connected therewith so as to have its readings affected thereby, and means connecting said indicator, and said other means for shifting the effective relation of said means, whereby the aeroplane is automatically brought on a true course.

16. The combination with an aeroplane, of a steering rudder therefor, a gyroscope, a servo-motor connected to said rudder, means displaceable by relative turning of the aeroplane and gyroscope for governing said servo-motor, and means for altering the relation of said other means and the rudder to turn the aeroplane.

17. A control system for aircraft comprising, in combination, means for automatically maintaining the aircraft headed in a predetermined direction, means for determining the true course of the air craft and connections between said two first named means for automatically changing the heading of the aircraft.

18. In an automatic pilot for aircraft, the combination with the vertical rudder, of a gyroscope for normally controlling the same to maintain the craft on a predetermined course, means for altering the course of the craft, including means for temporarily rendering the gyroscope control ineffective and centralizing said gyroscope, and, means for turning the rudder to bring the craft to a new course.

19. In an automatic steering device for dirigible craft in combination, a gyro rotor, a rotor bearing casing therefor, a ring rotatable about an axis, said ring supporting said casing for turning about a second axis, and means for centralizing the gyro casing about both axes comprising a member adapted to engage said casing and cause rotation thereof toward the central position about one axis while preventing movement away from the central position about the other axis and means controlled by the relative position of said gyroscope and craft to govern the course thereof.

20. In an automatic pilot for aeroplanes, the combination with a rudder and a control device therefor of a gyroscope, a servo-motor connected with said rudder, means operable by relative turning of the gyroscope and aeroplane for controlling said motor, a follow-up connection from said rudder to said means, and means responsive to movement of said control device for severing said follow-up connection and rendering said servo-motor inoperative.

21. In an automatic pilot for aeroplanes, the combination with a rudder and a control device therefor, of a gyroscope, a servo-motor connected with said rudder, means comprising a control member connected to said gyroscope and an independently mounted cooperating control member for governing said servo-motor from said gyroscope, and means brought into action by movement of said device for rendering said servo-motor inoperative and for moving the second mentioned control member into a definite position with respect to the other control member.

22. In a steering device for aeroplanes, the combination with a vertical rudder, of a servo-motor for controlling the same, a gyroscope, means for supporting the same for turning about a vertical axis and for oscillation about a horizontal axis, means operable by relative turning of the gyroscope and aeroplane about a vertical axis for controlling said motor, means for shifting the relation between the gyroscope and rudder, for changing the course of the aeroplane, and a follow-up connection from the rudder to the second mentioned means.

23. In an automatic pilot for aircraft, the combination with the vertical rudder, of a gyroscope for normally controlling the same, to maintain the craft on a predetermined course, control members mounted respectively on the gyroscope and aircraft, a servo-motor controlled therefrom and connected to the rudder, and means for altering the course of the craft including means for turning the rudder to bring the craft to a new course, means for throwing out of action the gyro-control, and means for centralizing the control members while the gyro control is out of action.

24. In a steering device for aeroplanes, the combination with a vertical rudder, of a servo-motor for controlling the same, a gyroscope, means for supporting the same for turning about a vertical axis and for oscillation about a horizontal axis, means operable by relative turning of the gyroscope and aeroplane about said vertical axis for controlling said motor, a follow-up connection from the rudder to the second mentioned means, and means including a centralizing device for the gyroscope for changing the course steered by the gyroscope during the flight of the aeroplane.

25. The combination with a gyroscope including a gimbal ring provided with an axial projection, of a member arranged to reciprocate in a predetermined path coincident with a line extending through the center of said gimbal ring for resetting said gyroscope into a predetermined position.

26. The combination with a gyroscope having a gimbal ring provided with an extension, of a member having diverging walls movable into and out of engagement with said extension through a predetermined path for controlling the operation of said gyroscope, and a power system arranged to move said member into and out of engagement with said gyroscope.

27. In gyroscopic apparatus for use in navigating aircraft, the combination with a ground observing sight, means for turning the same, a gyroscope, an indicating means connected to said gyroscope, and means operated from said first named means for altering said indicating means when it is desired to change the course.

In testimony whereof I have affixed my signature.

LAWRENCE B. SPERRY.